United States Patent
Kang

(10) Patent No.: US 11,040,696 B2
(45) Date of Patent: Jun. 22, 2021

(54) VEHICLE SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventor: Seungkyu Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/656,954

(22) Filed: Oct. 18, 2019

(65) Prior Publication Data

US 2020/0391693 A1 Dec. 17, 2020

(30) Foreign Application Priority Data

Jun. 14, 2019 (KR) .................. 10-2019-0070750

(51) Int. Cl.
*B60R 22/48* (2006.01)
*B60N 2/00* (2006.01)
*B60N 2/28* (2006.01)
*G01G 19/414* (2006.01)

(52) U.S. Cl.
CPC .............. *B60R 22/48* (2013.01); *B60N 2/002* (2013.01); *B60N 2/28* (2013.01); *B60R 2022/4808* (2013.01); *B60R 2022/4866* (2013.01); *G01G 19/4142* (2013.01)

(58) Field of Classification Search
CPC ........ G08B 25/10; G08B 21/02; G08B 21/04; G08B 21/06; G08B 21/22; G08B 23/00; B60H 1/00742; B60H 1/00964; B60H 1/00778; B60H 1/267; B60N 2/002; B60N 2/26; B60N 2/265; B60N 2/28; B60N 2/2803; B60Q 1/00; B60R 21/015; B60R 22/04
See application file for complete search history.

(56) References Cited

U.S. PATENT DOCUMENTS

| 6,362,734 B1 * | 3/2002 | McQuade | ............... B60R 22/48 180/267 |
| 2003/0071444 A1 * | 4/2003 | Knox | ............... B60R 21/01516 280/735 |

(Continued)

FOREIGN PATENT DOCUMENTS

KR 10-1709182 B1 2/2017

*Primary Examiner* — Van T Trieu
(74) *Attorney, Agent, or Firm* — Brinks Gilson & Lione

(57) ABSTRACT

The vehicle system includes an output device, a plurality of rear seats, a plurality of belt buckle sensors provided on each of the plurality of rear seats, a plurality of seat belt reminder (SBR) sensors provided on each of the plurality of rear seats, and a controller. The controller is configured to determine one rear seat on which a passenger or an object having a weight equal to or less than a predetermined weight is located based on an output value of the SBR sensor, determine whether a seat belt corresponding to the determined rear seat is worn based on an output value of the belt buckle sensor, and control the output device to output a warning message when the vehicle is turned off and a door of the rear seat is not opened or closed in a state in which the seat belt is worn.

16 Claims, 7 Drawing Sheets

(56) References Cited

U.S. PATENT DOCUMENTS

| | | | |
|---|---|---|---|
| 2004/0129478 A1* | 7/2004 | Breed | B60N 2/0276 |
| | | | 180/273 |
| 2006/0208911 A1* | 9/2006 | Davis | B60N 2/26 |
| | | | 340/573.4 |
| 2007/0126561 A1* | 6/2007 | Breed | B60R 25/2081 |
| | | | 340/426.13 |
| 2015/0130605 A1* | 5/2015 | Helm | B60N 2/2812 |
| | | | 340/457.1 |
| 2017/0096080 A1* | 4/2017 | McLean, Jr. | B60N 2/2845 |
| 2019/0232818 A1* | 8/2019 | Gangu | G08B 21/22 |

* cited by examiner

# VEHICLE SYSTEM AND METHOD OF CONTROLLING THE SAME

CROSS-REFERENCE TO RELATED APPLICATION

This application claims priority to and the benefit of Korean Patent Application No. 10-2019-0070750, filed on Jun. 14, 2019, which is incorporated herein by reference in its entirety.

FIELD

The present disclosure relates to a vehicle system capable of sensing a passenger of a rear seat and a control method thereof.

BACKGROUND

The statements in this section merely provide background information related to the present disclosure and may not constitute prior art.

Generally, a vehicle may detect a movement of a passenger sitting on a rear seat by using an ultrasonic sensor. However, we have discovered that the ultrasonic sensor may not be able to detect the movement of the passenger when the passenger's movement is minute, and may increase the production cost of the vehicle.

In addition, the vehicle may measure a load on a rear seat using a seat belt reminder (SBR) sensor. However, the vehicle also uses the SBR sensor to determine whether there is a passenger or an object on the rear seat during driving.

The above information disclosed in this Background section is only for enhancement of understanding of the background of the present disclosure, and therefore it may contain information that does not form the prior art that is already known to a person of ordinary skill in the art.

SUMMARY

The present disclosure provides a vehicle capable of determining whether there is a passenger positioned on a rear seat in a situation where the vehicle is turned off, and warning that a passenger is in the vehicle.

In accordance with an aspect of the present disclosure, a vehicle system for a vehicle includes an output device, a plurality of rear seats, a plurality of belt buckle sensors provided on each of the plurality of rear seats, a plurality of seat belt reminder (SBR) sensors provided on each of the plurality of rear seats, and a controller configured to determine at least one rear seat on which a passenger or an object having a weight equal to or less than a predetermined weight is located based on an output value of the SBR sensor, determine whether a seat belt corresponding to the determined at least one rear seat is worn based on an output value of the belt buckle sensor, and control the output device to output a warning message when the vehicle is turned off and a door of the rear seat is not opened or closed in a state in which the seat belt is worn.

The controller may be further configured to control the output device to output the warning message again until the door is opened or closed when there is a change in the output value of the SBR sensor according to a movement of the passenger after the warning message is output.

The controller may be further configured to control the output device to output the warning message until the door is opened or closed when the vehicle is turned off and the door is not opened or closed while there is a change in the output value of the SBR sensor due to a movement of the passenger in a state where the seat belt is not worn.

The controller may be further configured to determine at least one rear seat on which a passenger or an object exceeding a predetermined weight is located based on an output value of the SBR sensor, and control the output device to output a message warning that the seat belt is not to be used when the seat belt corresponding to the determined at least one rear seat is not worn.

The output device may include a display provided inside the vehicle.

The output device may include a horn, and the controller may control the horn to output a warning sound corresponding to the warning message.

The output device may include a lamp device, and the controller may control the lamp device to output the warning message by repeating lighting and blinking.

The output device may include a communication circuitry for performing communication with a user terminal device, and the controller may control the communication circuitry to transmit the warning message to the user terminal device.

In accordance with another aspect of the present disclosure, a method of controlling a vehicle system including an output device, a plurality of rear seats, a plurality of belt buckle sensors provided on each of the plurality of rear seats, and a plurality of seat belt reminder (SBR) sensors provided on each of the plurality of rear seats, the method includes the steps of determining at least one rear seat on which a passenger or an object having a weight equal to or less than a predetermined weight is located based on an output value of the SBR sensor, determining whether a seat belt corresponding to the determined at least one rear seat is worn based on an output value of the belt buckle sensor, and controlling the output device to output a warning message when the vehicle is turned off and a door of the rear seat is not opened or closed in a state in which the seat belt is worn.

The method may further include the step of controlling the output device to output the warning message again until the door is opened or closed when there is a change in the output value of the SBR sensor according to a movement of the passenger after the warning message is output.

The method may further include the step of controlling the output device to output the warning message until the door is opened or closed when the vehicle is turned off and the door is not opened or closed while there is a change in the output value of the SBR sensor due to a movement of the passenger in a state where the seat belt is not worn.

The method may further include the step of determining at least one rear seat on which a passenger or an object exceeding a predetermined weight is located based on an output value of the SBR sensor, and controlling the output device to output a message warning that the seat belt is not to be used when the seat belt corresponding to the determined at least one rear seat is not worn.

The output device may include a display provided inside the vehicle.

The output device may include a horn, and the step of controlling the output device may include the step of controlling the horn to output a warning sound corresponding to the warning message.

The output device may include a lamp device, and the step of controlling the output device may include the step of controlling the lamp device to output the warning message by repeating lighting and blinking.

The output device may include a communication circuitry for performing communication with a user terminal device, and the step of controlling the output device may include the step of controlling the communication circuitry to transmit the warning message to the user terminal device.

According to one aspect of the present disclosure, it is possible to promptly notify the user of the vehicle system whether the infant is on board by determining whether there is a passenger positioned on a rear seat in a situation where the vehicle is turned off, and warning that the passenger is in the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will not be described various forms thereof, given by way of example, reference being made to the accompanying drawings, in which.

Figure 1:
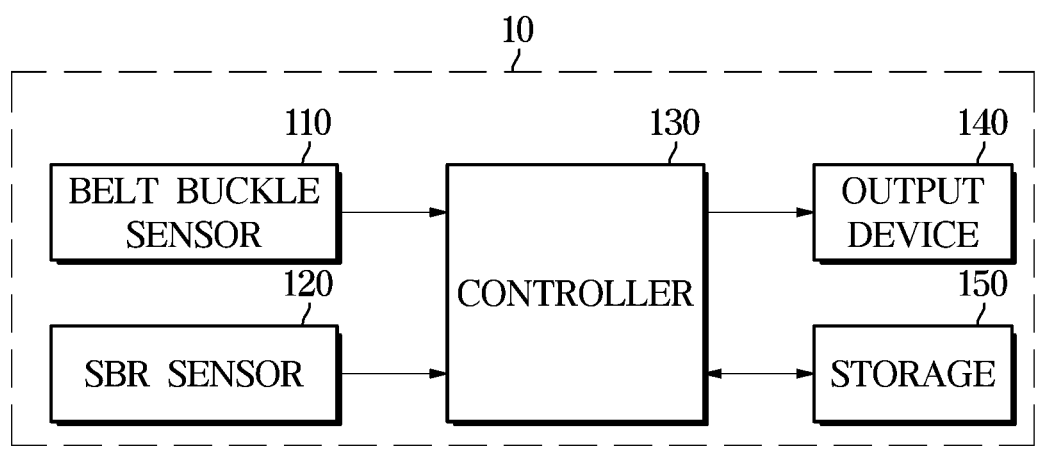
FIG. 1 is a control block diagram of a vehicle according to an exemplary form of the present disclosure.

The drawing described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be understood that when a component is referred to as being "connected" to another component, it can be directly or indirectly connected to the other component. When a component is indirectly connected to another component, it may be connected to the other component through a wireless communication network.

Also, it will be understood that the terms "includes," "comprises," "including," and/or "comprising," when used in this specification, specify the presence of a stated component, but do not preclude the presence or addition of one or more other components.

Also, it is to be understood that the singular forms "a," "an," and "the" include plural referents unless the context clearly dictates otherwise.

As used herein, the terms "portion," "unit," "block," "member," and "module" refer to a unit that can perform at least one function or operation. For example, these terms may refer to at least one piece of software stored in a memory or at least one piece of hardware, such as a Field Programmable Gate Array (FPGA) or an Application Specific Integrated Circuit (ASIC), or at least one process that is processed by a processor.

Hereinafter, forms of a vehicle according to an aspect of the present disclosure and a method of controlling the vehicle will be described in detail with reference to the accompanying drawings.

Figure 2:
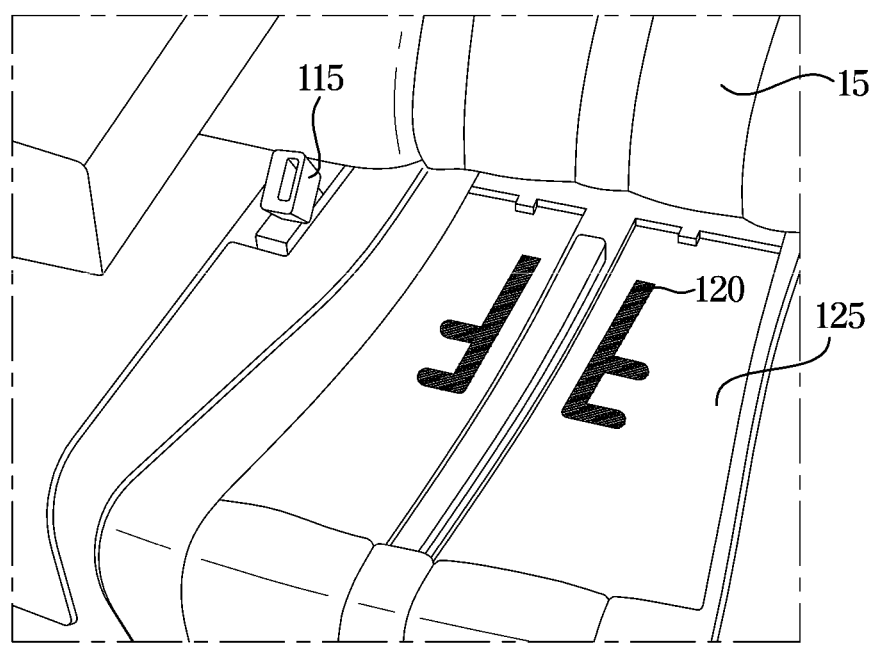
FIG. 2 is a view illustrating a rear seat of the vehicle according to an exemplary form of the present disclosure.

FIG. 1 is a control block diagram of a vehicle system according to a form of the disclosure, and FIG. 2 is a view illustrating a rear seat of the vehicle according to an exemplary form of the present disclosure.

Referring to FIG. 1, a vehicle system 10 according to an exemplary form of the present disclosure includes a belt buckle sensor 110 for measuring whether the seat belt is worn, a seat belt reminder (SBR) sensor 120 for measuring the load of the rear seat, a controller 130 for determining whether a passenger is on a rear seat based on output values of the belt buckle sensor 110 and the SBR sensor 120 and determining whether to output a warning message, an output device 140 for outputting a warning message, and a storage 150 for storing various information necessary for controlling the vehicle system 10.

The belt buckle sensor 110 according to an exemplary form of the present disclosure may be configured as either a micro switch or a hall sensor, and may output different output values depending on whether the seat belt is worn.

The belt buckle sensor 110 may be provided on each of the plurality of rear seats and may be provided on a buckle 115 of a rear seat 15 shown in FIG. 2.

As shown in FIG. 2, the SBR sensor 120 according to an exemplary form of the present disclosure may be provided inside a bench seat 125 of the rear seat 15 and may output a different output value depending on the load of the passenger or the object located on the rear seat 15.

That is, the SBR sensor 120 is sensed when the bench seat 125 is pressed by the passenger or the load of the object located on the rear seat 15, and may output different resistance values according to the load.

For example, when the rear seat 15 is vacant, the set resistance value output from the SBR sensor 120 is infinite, and when the passenger is seated on the rear seat 15, the SBR sensor 120 may output different set resistance values according to the load of the passenger.

For this purpose, the SBR sensor 120 may include a sensing cell sensing a load and a conductive material electrically contacting the sensing cell, and may be formed in a predetermined pattern so as to have a preset resistance value.

However, the configuration of the SBR sensor 120 is not limited to the above example, and any pressure sensor capable of measuring a load can be used without limitation. That is, the SBR sensor 120 may output various output values in addition to the resistance value. Hereinafter, the resistance value will be described as an example.

A controller 130 according to an exemplary form of the present disclosure may determine whether the passenger has been loaded on the rear seat 15 based on the output values of the belt buckle sensor 110 and the SBR sensor 120, and determine whether to output the warning message. The configuration for determining whether to output the warning message will be described later in detail.

The controller 130 may correspond to an electronic control unit (ECU) that is electrically connected to the SBR sensor 120 to control the SBR sensor 120 and may correspond to a body control module (BCM) of the vehicle system 10 according to an exemplary form of the present disclosure.

At this time, the controller 130 may include at least one memory storing a program for performing the above-described operations and operations, which will be described below, and at least one processor for executing the stored program. When there are a plurality of the memories and processors, they may be integrated into one chip or provided at physically separated positions.

The output device 140 according to a form may output a warning message under the control of the controller 130.

The output device 140 may include a display provided within the vehicle system 10. For example, the display may be provided in a cluster, and may be provided across a cluster and a center fascia.

The panel of the display may be at least one of a cathode ray tube (CRT) panel, a liquid crystal display (LCD) panel, a light emitting diode (LED) panel, an organic light emitting diode (OLED) panel, a plasma display panel (PDP), and a field emission display (FED) panel.

However, there is no limit to the number and position of the display as long as capable of visually transmitting the information to the user of the vehicle system 10.

In addition, the output device 140 may include a horn, and may output a warning sound corresponding to the warning message under the control of the controller 130.

In addition, the output device 140 may include a lamp device and may output a warning message by repeating lighting and blinking under the control of the controller 130. At this time, the lamp device may include at least one of a headlamp, a tail lamp, a turn signal lamp, or a fog lamp.

Also, the output device 140 may include a communication circuitry for performing communication with the user terminal device, and may transmit a warning message to the user terminal device under the control of the controller 130.

That is, the communication circuitry may transmit the warning message to the user terminal device via the wireless communication. At this time, the wireless communication may include cellular communication using, for example, at least one of 5th generation (5G), Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile communications (GSM), or the like. The wireless communication may include, for example, at least one of wireless fidelity (WiFi), Bluetooth, Bluetooth low power (BLE), Zigbee, Near Field Communication (NFC), Magnetic Secure Transmission, Radio Frequency (RF), or Body Area Network (BAN). However, the disclosure is not limited to the above example, and any communication protocol capable of performing wireless communication can be used without limitation.

The storage 150 may store various kinds of information required for the control of the vehicle system 10, and may store information on the correlation between the output value of the belt buckle sensor 110 and whether the seat belt is worn, and information about the correlation between the output value of the SBR sensor 120 and the load on the rear seat 15.

The storage 150 according to one form may correspond to a memory that stores the above-described information and the following information, and may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)) for storing various information, although not limited to these.

The configuration of the vehicle system 10 has been described above. Hereinafter a configuration for determining whether an infant passenger is carried on the rear seat 15 of the vehicle and outputting a warning message based on the determination is described in detail.

Figure 3:
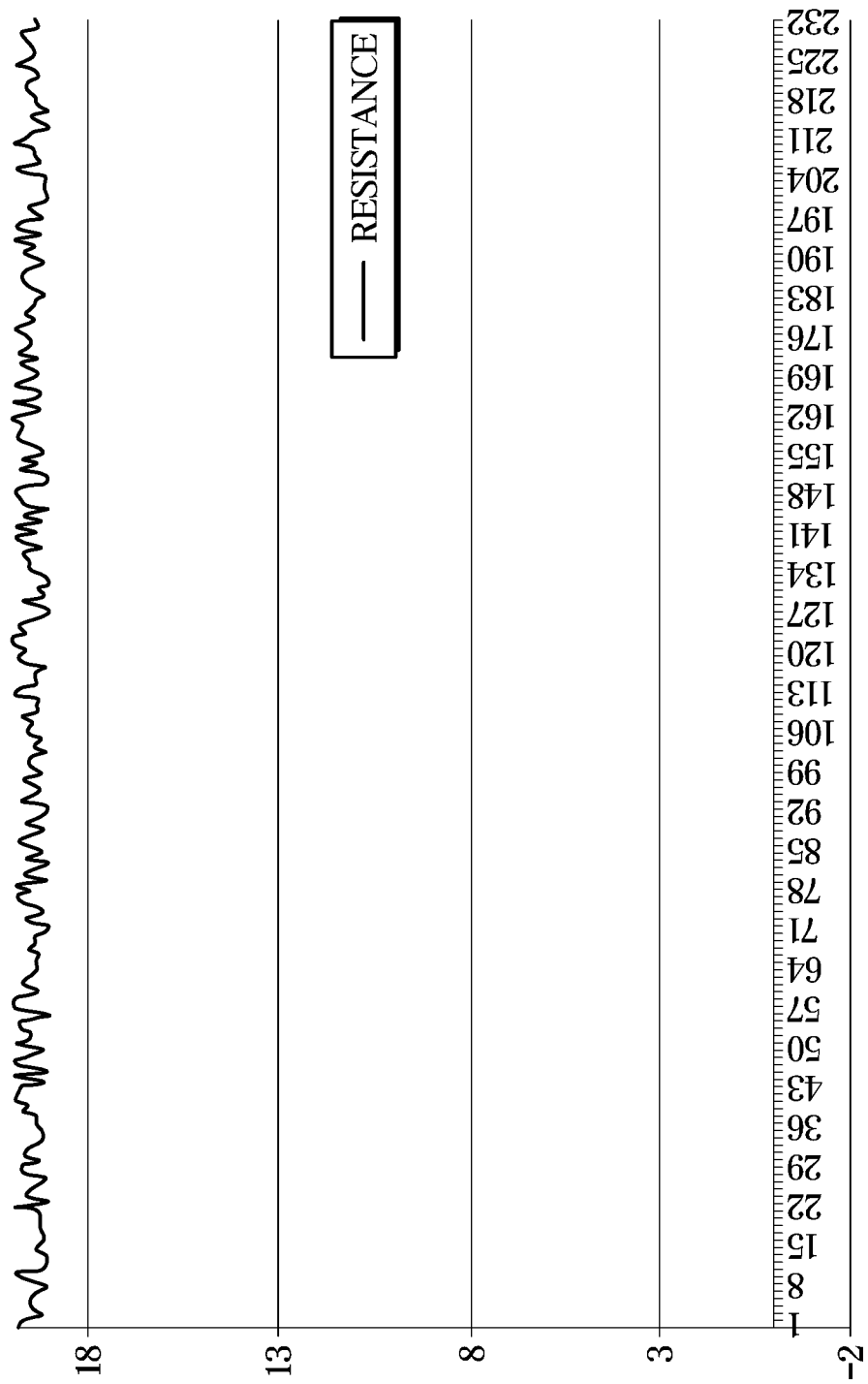
FIG. 3 is a view illustrating an output value of a seat belt reminder (SBR) sensor when an object is not positioned on a rear seat of the vehicle according to an exemplary form of the present disclosure.
Figure 4:
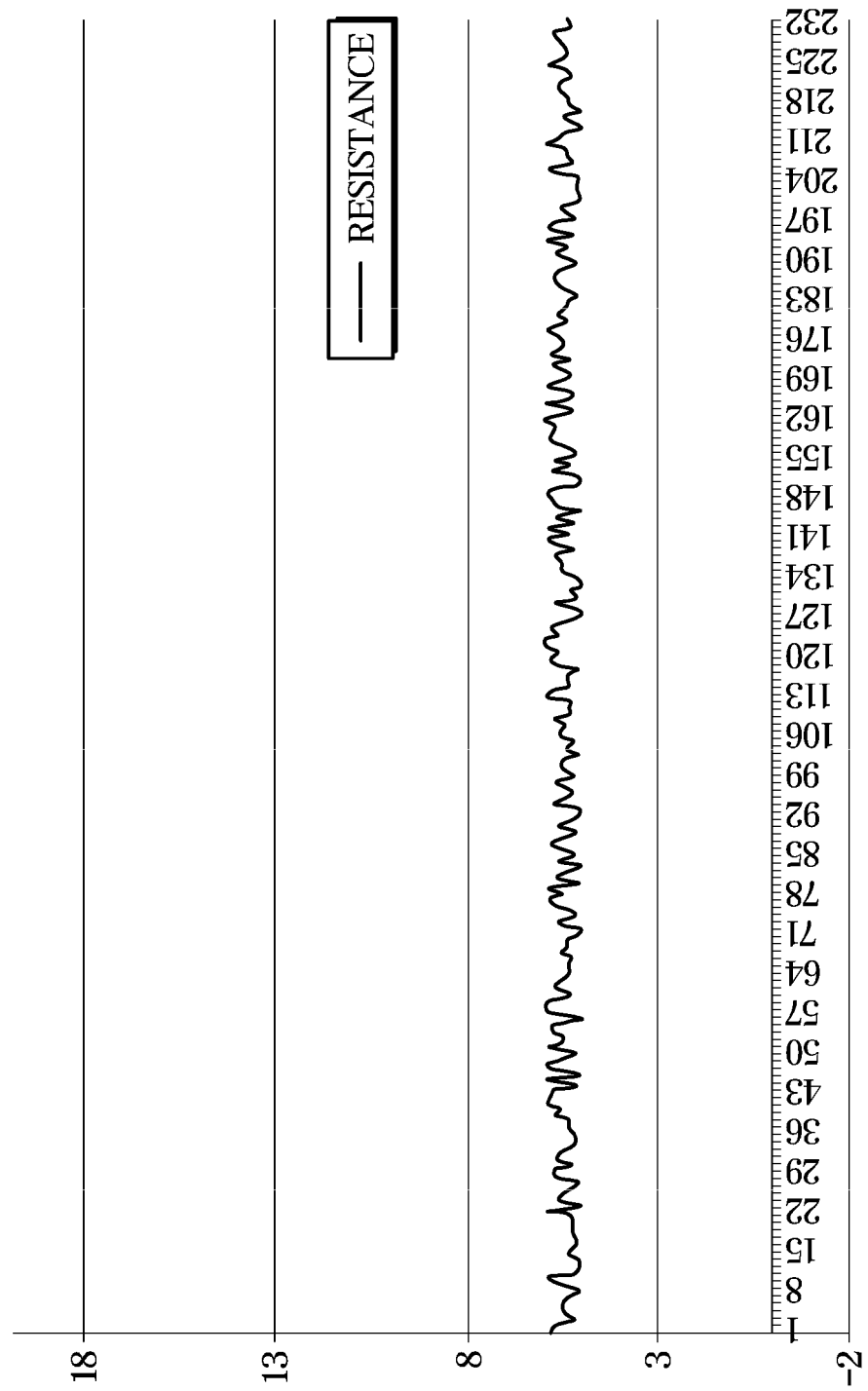
FIG. 4 is a view illustrating an output value of the SBR sensor when an object is positioned on a rear seat of the vehicle according to an exemplary form of the present disclosure.
Figure 5:
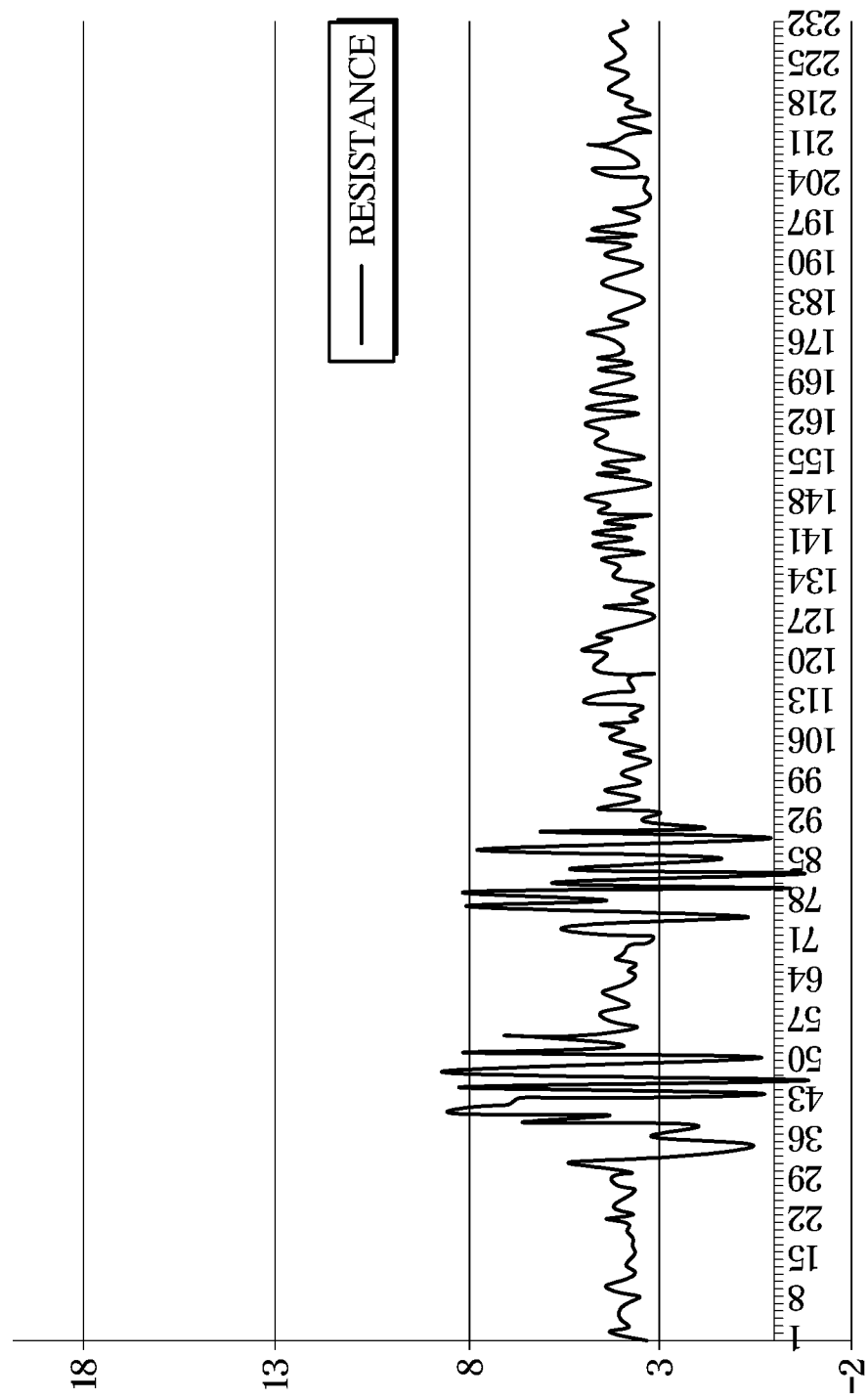
FIG. 5 is a view illustrating an output value of the SBR sensor when a passenger is located on a rear seat of the vehicle according to an exemplary form of the present disclosure.

FIG. 3 is a view illustrating an output value of a seat belt reminder (SBR) sensor 120 when an object is not positioned on a rear seat 15 of the vehicle according to an exemplary form of the present disclosure, and FIG. 4 is a view illustrating an output value of the SBR sensor 120 when an object is positioned on the rear seat 15 of the vehicle according to an exemplary form of the present disclosure, and FIG. 5 is a view illustrating an output value of the SBR sensor 120 when a passenger is located on the rear seat 15 of the vehicle according to an exemplary form of the present disclosure.

The controller 130 may determine whether the passenger has been loaded on the rear seat 15 based on the output values of the belt buckle sensor 110 and the SBR sensor 120, and determine whether to output the warning message.

Specifically, the controller 130 may determine at least one rear seat 15 in which a passenger or an object having a weight less than a predetermined value is located based on the output value of the SBR sensor 120.

When the installed rear seat 15 corresponds to a vacant seat, the SBR sensor 120 may output a constant resistance value over time as shown in FIG. 3, and the SBR sensor 120 may output a low resistance value according to time when an object exists on the rear seat 15 as shown in FIG. 4, as compared with the resistance value when the rear seat 15 is vacant.

That is, the SBR sensor 120 is sensed when the bench seat 125 is pressed by the passenger or the load of the object located on the rear seat 15, and may output different resistance values according to the load.

the controller 130 may determine the weight of the passenger or the object corresponding to the output value of the SBR sensor 120 based on the information on the correlation between the output value of the SBR sensor 120 and the load on the rear seat 15, and the controller 130 may determine at least one rear seat 15 at which a passenger or the object having a weight equal to or less than a predetermined weight is located.

The controller 130 may also determine whether a seat belt corresponding to at least one rear seat 15 determined based on the output value of the belt buckle sensor 110 has been worn.

That is, when the SBR sensor 120 outputs an output value corresponding the weight equal to or less than the predetermined weight (35 kg) because the infant is seated or the object is loaded on the rear seat 15, the controller 130 may determine whether the infant is seated on the rear seat 15 or not by determining whether the seat belt is worn, based on the output value of the belt buckle sensor 110.

Thereafter, the controller 130 may control the output device 140 to output a warning message when the vehicle is turned off and there is no opening/closing of the door while the seat belt is worn.

When it is determined that the seat belt is worn, the infant is assumed to be aboard, the vehicle system 10 may output a warning message to the user of the vehicle system 10 when the vehicle is turned off and there is no opening/closing of the door in order to inhibit the infant passenger from being left after the vehicle is turned off.

At this time, the controller 130 may receive an output value from a door switch provided on each door to determine whether the door is open or closed.

The controller 130 may control the output device 140 to re-output the warning message until a door is opened or closed, when there is a change in the output value of the SBR sensor 120 due to the movement of the passenger after the warning message is output.

Specifically, the SBR sensor 120 may output an amplitude oscillation of an irregular resistance, as shown in FIG. 5, when the passenger is located on the rear seat 15 and the load applied to the rear seat 15 changes as the passenger moves.

That is, when the change of the output value of the SBR sensor 120 according to the movement is measured because the infant passenger is left unchanged even after the warning message is output, the vehicle system 10 may continuously warn the user of the vehicle system 10 that the infant passenger is left unattended by re-outputting the warning message until the door is opened and closed.

The controller 130 may also control the output device 140 to output a warning message until the rear door is opened and closed when the vehicle is turned off and there is no opening and closing of the starter door while there is a change in the output value of the SBR sensor 120 due to the movement of the passenger in the state where the seat belt is not worn.

That is, the vehicle system 10 may determine that the infant passenger is carried on the rear seat 15, when a change in the output value of the SBR sensor 120 is measured even when the seat belt is not worn. At this time, the vehicle system 10 may output a warning message until the door is opened or closed, when the vehicle is turned off and there is no opening/closing of the door.

In addition, the controller 130 may determine at least one rear seat 15 on which a passenger or an object exceeding a predetermined weight is located based on an output value of the SBR sensor 120, and may control the output device 140 to output a message warning that the seat belt is not to be used when the seat belt corresponding to the determined at least one rear seat 15 is not worn.

Through this, the vehicle system 10 may recommend a passenger to wear a seat belt when an adult passenger is located on the rear seat 15 and does not wear the seat belt.

Figure 6:
FIG. 6 is a view illustrating a case where an output device of the vehicle according to an exemplary form of the present disclosure outputs a warning message.

FIG. 6 is a view illustrating a case where an output device 140 of the vehicle system 10 according to an exemplary form of the present disclosure outputs a warning message.

Referring to FIG. 6, the display of the output device 140 may output a message indicating that the passenger is located on the rear seat 15 and confirmation of the rear seat 15 is required, when the controller 130 may control the output device 140 to output a warning message.

However, the form that outputs the warning message is not limited to the above example, and the controller 130 may control the output device 140 such that at least one of the display, the horn, and the lamp device outputs a warning message.

For example, the controller 130 may control the horn to output a warning sound corresponding to the warning message, may control the lamp device to output a warning message by repeating lighting and blinking, and may control the communication circuitry to transmit a warning message to the user terminal device.

Hereinafter a method for controlling the vehicle system 10 will be described. The vehicle system 10 according to the above-described form may be applied to the control method of the vehicle, as will be described later. Therefore, description given above with reference to FIGS. 1 to 6 may be applied to the control method of the vehicle system 10 in the same manner, unless otherwise noted.

Figure 7:
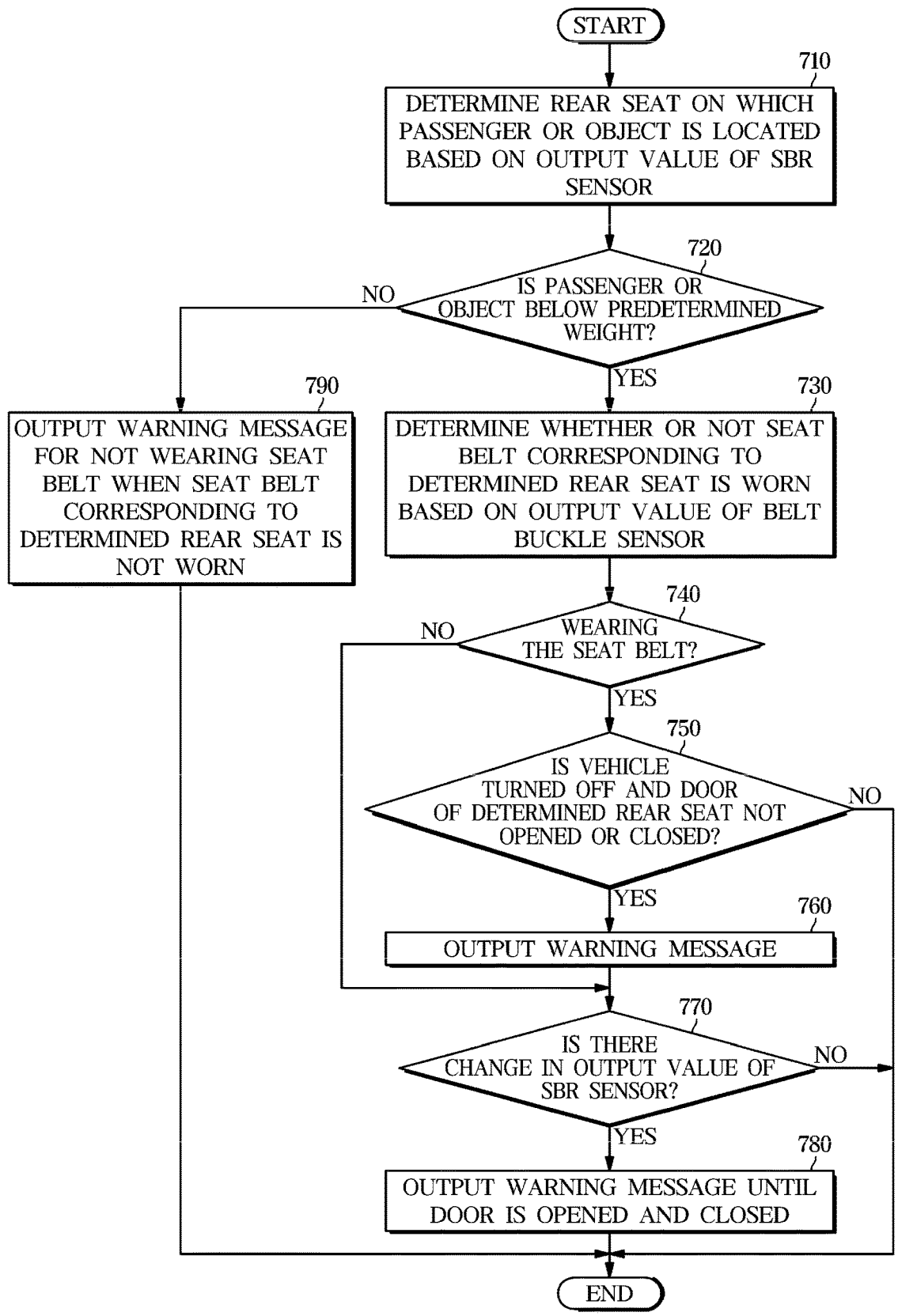
FIG. 7 is a flow chart illustrating a case of outputting a warning message indicating that a passenger is seated on a rear seat, in a method of controlling the vehicle according to an exemplary form of the present disclosure.

FIG. 7 is a flow chart illustrating a case of outputting a warning message indicating that a passenger is seated on a rear seat, in a method of controlling the vehicle system according to an exemplary form of the present disclosure.

Referring to FIG. 7, the vehicle system 10 may determine a rear seat 15 on which the passenger or object is located based on the output value of the SBR sensor 120 (710).

That is, the controller 130 of the vehicle system 10 may determine the rear seat 15 having an output value lower than the output value of the SBR sensor 120 at the time of vacancy, as the rear seat 15 in which the passenger or the object is located.

When the passenger or object having a weight is equal to or less than the predetermined weight (Yes in 720), the vehicle system 10 may determine whether a seat belt corresponding to the determined rear seat 15 has been worn based on the output value of the belt buckle sensor 110 (730).

The vehicle system 10 may output a warning message when the vehicle is turned off and there is no opening/closing of the seated door (Yes in 750) in a state in which the seat belt is worn (Yes in 740) (760).

When the seat belt is not worn (No in 740) or when there is a change in the output value of the SBR sensor 120 after outputting the warning message in step 760 (Yes in 770), the vehicle system 10 according to a form may re-output the warning message until the door is opened or closed (780).

That is, the controller 130 may control the output device 140 to output a warning message until the door is opened or closed, when there is a change in the output value of the SBR sensor 120 due to the movement of the passenger after the warning message is output.

The controller 130 may also control the output device 140 to output a warning message until the rear door is opened and closed when the vehicle is turned off and there is no opening and closing of the rear door, while there is a change in the output value of the SBR sensor 120 due to the movement of the passenger in the state where the seat belt is not worn.

Further, when the passenger or the object exceeds the predetermined weight (No in 720), the vehicle system 10 may output a message warning of the non-use of the seat belt when the seat belt corresponding to the determined rear seat 15 is not worn (790).

That is, the controller 130 may determine at least one rear seat 15 on which a passenger or an object exceeding a predetermined weight is located based on an output value of the SBR sensor, and may control the output device 140 to output a message warning that the seat belt is not to be used when the seat belt corresponding to the determined at least one rear seat 15 is not worn.

As is apparent from the above description, it is possible to promptly notify the user of the vehicle system 10 whether the infant is on board by determining whether there is a passenger positioned on a rear seat in a situation where the vehicle is turned off, and warning that a passenger is in the vehicle.

Meanwhile, the disclosed forms may be implemented in the form of a recording medium storing instructions that are executable by a computer. The instructions may be stored in the form of a program code, and when executed by a processor, the instructions may generate a program module to perform operations of the disclosed forms. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A vehicle system for a vehicle, the vehicle system comprising:
    an output device configured to output a warning message;
    a plurality of rear seats arranged in the vehicle and provided with a plurality of buckles;
    a plurality of belt buckle sensors respectively provided on the plurality of buckles;
    a plurality of seat belt reminder (SBR) sensors respectively provided on the plurality of rear seats and configured to measure a weight of a passenger or an object present on rear seats of the plurality of rear seats; and
    a controller configured to:
        determine, among the rear seats, at least one rear seat where the measured weight of the passenger or the object is less than a predetermined weight based on an output value of a SBR sensor, among the plurality of SBR sensors, installed in the at least one rear seat;
        determine whether a seat belt installed in the determined at least one rear seat is buckled based on an output value of a belt buckle sensor, among the plurality of belt buckle sensors, installed in the at least one rear seat;
        determine whether the vehicle is turned off when the seat belt installed in the determined at least one rear seat is buckled;
        determine whether a door adjacent to the determined at least one rear seat is not opened, or closed in a state in which the seat belt is buckled; and
        control the output device to output the warning message when the vehicle is turned off and the door adjacent to the determined at least one rear seat is not opened, or closed.

2. The vehicle system according to claim 1, wherein the controller is further configured to:
    control the output device to output the warning message again until the door is opened or closed when there is a change in the output value of the SBR sensor according to a movement of the passenger after the warning message is output.

3. The vehicle system according to claim 1, wherein the controller is further configured to:
    control the output device to output the warning message until the door is opened or closed when the vehicle is turned off and the door is not opened, or closed while there is a change in the output value of the SBR sensor due to a movement of the passenger in a state where the seat belt is unbuckled.

4. The vehicle system according to claim 1, wherein the controller is configured to:
    determine, among the plurality of rear seats, at least one rear seat where the measured weight of the passenger or the object is greater than the predetermined weight based on an output value of a SBR sensor among the plurality of SBR sensors; and
    control the output device to output a message warning that the seat belt is not to be used when the seat belt installed in the determined at least one rear seat is unbuckled.

5. The vehicle system according to claim 1, wherein the output device comprises a display provided inside the vehicle.

6. The vehicle system according to claim 1, wherein the output device comprises a horn,
    wherein the controller controls the horn to output a warning sound corresponding to the warning message.

7. The vehicle system according to claim 1, wherein the output device comprises a lamp device, and
    wherein the controller controls the lamp device to output the warning message by repeating lighting and blinking.

8. The vehicle system according to claim 1, wherein the output device comprises a communication circuitry for performing communication with a user terminal device,
    wherein the controller controls the communication circuitry to transmit the warning message to the user terminal device.

9. A method of controlling a vehicle system for a vehicle, the vehicle system comprising an output device, a plurality of rear seats arranged in the vehicle and provided with a plurality of buckles, a plurality of belt buckle sensors respectively provided on the plurality of buckles, and a plurality of seat belt reminder (SBR) sensors respectively provided on the plurality of rear seats to measure a weight of a passenger or an object present on rear seats of the plurality of rear seats, the method comprising the steps of:
    determining, among the rear seats, at least one rear seat where the measured weight of the passenger or the object is less than a predetermined weight based on an output value of a SBR sensor, among the plurality of SBR sensors, installed in the at least one rear seat;
    determining whether a seat belt installed in the determined at least one rear seat is buckled based on an output value of a belt buckle sensor, among the plurality of belt buckle sensors, installed in the at least one rear seat;
    determining whether the vehicle is turned off when the seat belt installed in the determined at least one rear seat is buckled;
    determining whether a door adjacent to the determined at least one rear seat is not opened, or closed in a state in which the seat belt is buckled; and
    controlling the output device to output a warning message when the vehicle is turned off and the door adjacent to the determined at least one rear seat is not opened, or closed.

10. The method according to claim 9, further comprising the step of:
    controlling the output device to output the warning message again until the door is opened or closed when there is a change in the output value of the SBR sensor according to a movement of the passenger after the warning message is output.

11. The method according to claim 9, further comprising the step of:
controlling the output device to output the warning message until the door is opened or closed when the vehicle is turned off and the door is not opened, or closed while there is a change in the output value of the SBR sensor due to a movement of the passenger in a state where the seat belt is unbuckled.

12. The method according to claim 9, further comprising the steps of:
determining, among the plurality of rear seats, at least one rear seat where the measured weight of the passenger or the object is greater than the predetermined weight based on an output value of a SBR sensor among the plurality of SBR sensors; and
controlling the output device to output a message warning that the seat belt is not to be used when the seat belt installed in the determined at least one rear seat is unbuckled.

13. The method according to claim 9, wherein the output device comprises a display provided inside the vehicle.

14. The method according to claim 9, wherein the output device comprises a horn,
wherein the step of controlling the output device comprises the step of controlling the horn to output a warning sound corresponding to the warning message.

15. The method according to claim 9, wherein the output device comprises a lamp device,
wherein the step of controlling the output device comprises the step of controlling the lamp device to output the warning message by repeating lighting and blinking.

16. The method according to claim 9, wherein the output device comprises a communication circuitry for performing communication with a user terminal device,
wherein the step of controlling the output device comprises the step of controlling the communication circuitry to transmit the warning message to the user terminal device.

* * * * *